(No Model.)
E. D. KENDALL.
PROCESS OF TREATING CERTAIN DERIVATIVES OF COAL TAR COLORS.
No. 256,330.   Patented Apr. 11, 1882.
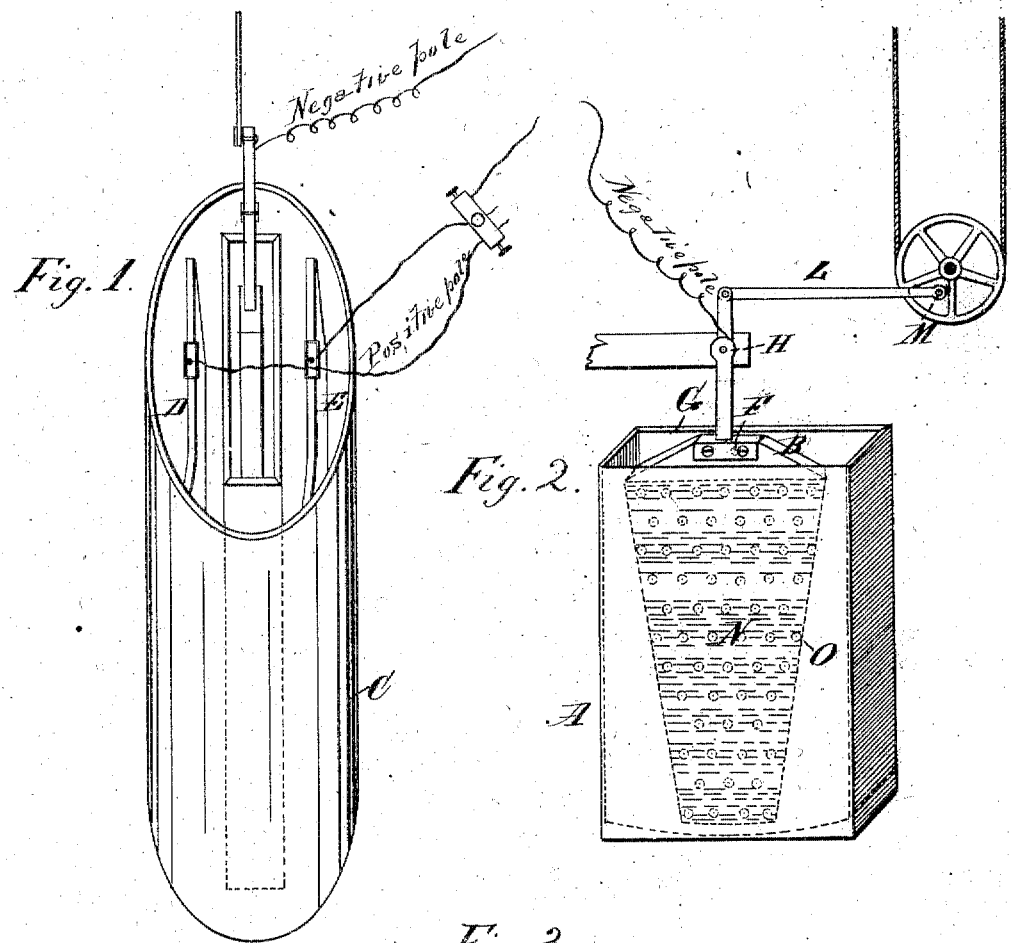

UNITED STATES PATENT OFFICE.

EDWARD D. KENDALL, OF BROOKLYN, NEW YORK.

PROCESS OF TREATING CERTAIN DERIVATIVES OF COAL-TAR COLORS.

SPECIFICATION forming part of Letters Patent No. 256,330, dated April 11, 1882.

Application filed December 16, 1881. (No model.)

*To all whom it may concern:*

Be it known that I, EDWARD D. KENDALL, residing in the city of Brooklyn, county of Kings, and State of New York, have invented a certain Improved Process of Treating Certain Derivatives of Coal-Tar Hydrocarbons, of which the following is a specification.

This invention has for its object, first, the production of aniline and toluidine from corresponding nitro-derivatives of coal-tar hydrocarbons; second, the production of various coloring substances from the aniline and toluidine to be used as dyes in the various departments of the arts; and the invention consists chiefly in the process of subjecting the substances to be treated and thereby converted to the action of the voltaic current either from a battery or a dynamo-electric generator by placing nitro-benzine or a mixture of nitro-benzine and nitro-toluine in a porous cup or cell and in a mixture of water and sulphuric acid or saline water, and connecting the same with the negative electrode of a battery or voltaic circuit in such a manner that the water will be decomposed and the nascent hydrogen will combine with the nitro-benzine to form aniline or mixed aniline and toluidine, as will hereinafter appear.

The invention further consists in subjecting the aniline, or a mixture of aniline and toluidine, to the action of the positive electrode of the battery or electric current in the presence of sulphuric acid and water, whereby a color-yielding solid product will be precipitated or deposited upon the positive electrodes or in the cell, as will hereinafter appear.

For the purpose of accomplishing these improvements I have made use of the well-known electrolytic cells with certain modifications; but these devices or apparatus form no part of the present invention, as they will be embodied in a future application for Letters Patent, this being limited to the process alone.

Figure 1 represents a perspective view of a cell, a porous cup therein, with the carbons in proper position. Fig. 2 is a side elevation of the porous cup with a carbon plate suspended in it, and Fig. 3 is a perspective view of three cells with their carbons and connections as would appear in an organized series of many cells for conducting the work on a large scale. Any other form of cell may, however, be used without departing from the nature of my invention, which, as already stated, consists in placing a certain quantity of the nitro-benzine or mixed nitro-benzine and nitro-toluine in a porous cup or cell, as at A, in which is suspended the carbon or negative electrode B, both of which are placed in a cell, C, which contains the positive electrode or carbon D and E, suspended on opposite sides of the porous cup or cell A, as shown at Fig. 1. The porous cup contains a mixture (by fluid measure) of, say, one part of the nitro-benzine, or mixture of the nitro-benzine and nitro-toluine, and two parts of ordinary sulphuric acid with thirty parts of water, in which is suspended the carbon plate B, attached to the negative pole of a battery, or its equivalent, while the other carbons, D and E, are suspended in a solution of acidulated water without any of the nitrated hydrocarbons in contact with them, the result of which is the water is decomposed and the oxygen is allowed to escape, while the nascent hydrogen effects the reduction of the nitro-benzine or mixed nitro-benzine and nitro-toluine to the production of the corresponding amido compounds. But, as is well known, if the hydrogen is once set free it will not act on the said nitrated hydrocarbons, which hydrocarbons, being of greater specific gravity than the dilute acid and insoluble therein, will not under ordinary circumstances be brought in contact with the nascent hydrogen over the surfaces of the carbon plate B. Consequently I have suspended the carbon plate B or negative electrode by a screw-clamp, F, attached to the end of a pendulous lever, G, supported upon a pivot, H, and said lever is connected by a link, L, to a crank-pin on a wheel at M, to which motion may be given in any convenient manner, so that the carbon plate B may be gently vibrated in the solution in the porous cup, and thereby effect the commingling of the elements therein, and thus further insure the contact of the said nitrated hydrocarbon with the hydrogen at the instant of its production or separation from the oxygen of the water. But to further insure the said combination the carbon plate B may be covered with a cloth or similar fibrous substance, as at N, the lower end of which is immersed in the liquid nitrated hydrocarbons and lifts the elements to be converted along the surfaces of the carbon plate where the hydrogen is being produced under the action of the voltaic current, and thus a more intimate relation may be established.

Holes may be formed in the cloth covering of the carbon, as shown at O, to permit a free circulation of the liquids in the porous cup.

I find that other acids and saline bodies may be used instead of the sulphuric acid, but with less advantage.

The second feature of my invention, which pertains to the production of color-yielding solids, and which is in fact an oxide of aniline or toluine, or both combined, will now be explained.

While the conversion is going on in the porous cup I have found that the aniline or toluidine, or both united in a mixture of sulphuric acid and water, may be placed in the cell C in contact with the positive electrodes or carbons D and E, and upon which will be precipitated variously-colored solids from the aniline or toluine, or both, from which, by different chemical processes, coloring substances may be obtained—as, for example, a rose-red, similar to "rosaniline," a dark blue, an emerald-green, a "sap-green," and several shades of these colors—and thus simultaneously with the production of the aniline or toluidine the color-yielding substances may be obtained from them and by the same battery or voltaic current; or, in the case of a dynamo-machine, without any increase of power.

I may here remark that the exact character of these solid bodies or deposits on the anode side of the battery has not yet been fully determined; but sufficient is known to show that various coloring substances adapted for dyeing various colors are thereby produced.

I therefore claim—

1. The method or process of producing aniline or toluine from their corresponding nitro derivatives of coal-tar hydrocarbons by means of the voltaic current through the cathode in the presence of acidulated water, as hereinbefore set forth.

2. The method of producing a color-yielding product or oxidized compound of aniline or toluine, or a mixture of both, by subjecting aniline or toluine, or a combination of both, to the action of the voltaic current through the anode in the presence of acidulated water, as hereinbefore set forth.

In witness whereof I have hereunto subscribed my name and affixed my seal in the presence of two subscribing witnesses.

EDWARD D. KENDALL. [L. S.]

Witnesses:
 EUGENE N. ELIOT,
 BOYD ELIOT.

In compliance with the request of the assignees of Letters Patent No. 256,330, granted April 11, 1882, upon the application of Edward D. Kendall of Brooklyn, N. Y., for an improvement in the "Process of Treating Certain Derivatives of Coal Tar Colors," said grant is hereby limited so as to expire when either English Patent No. 384, dated January 25, 1882, French Patent No. 147,061, dated January 25, 1882, or Belgium Patent No. 56,885, dated January 25, 1882, expires; and it is hereby certified that the proper entries and corrections have been made in the files and records of the Patent Office.

This amendment is made that the Patent may conform to the provisions of section 4887 of the Revised Statutes.

Signed, countersigned, and sealed this 7th day of November, A. D. 1882.

[SEAL.]

M. L. JOSLYN,
*Acting Secretary of the Interio*

Countersigned:

E. M. MARBLE,
*Commissioner of Patents.*